United States Patent [19]
Stumer

[11] Patent Number: 6,035,024
[45] Date of Patent: Mar. 7, 2000

[54] APPARATUS AND METHOD FOR DISPLAYING NUMBERS IN A COMMUNICATION NETWORK

[75] Inventor: Peggy Stumer, Boca Raton, Fla.

[73] Assignee: Siemens Information and Communication Networks, Inc., Boca Raton, Fla.

[21] Appl. No.: 08/854,424

[22] Filed: May 12, 1997

[51] Int. Cl.[7] .................................................. H04M 1/56
[52] U.S. Cl. .................... 379/142; 379/88.21; 379/93.23
[58] Field of Search ...................................... 379/127, 142, 379/157, 88.19–88.21, 93.23, 120, 354; 455/414, 415; 370/259, 271

[56] References Cited

U.S. PATENT DOCUMENTS

| | | | |
|---|---|---|---|
| 4,924,496 | 5/1990 | Figa et al. ................................. | 379/142 |
| 5,475,744 | 12/1995 | Ikeda ........................................ | 379/127 |
| 5,528,680 | 6/1996 | Karpicke .................................. | 379/355 |
| 5,590,184 | 12/1996 | London .................................... | 379/142 |
| 5,724,412 | 3/1998 | Srinivasan ............................. | 379/93.23 |
| 5,754,636 | 5/1998 | Bayless et al. .......................... | 379/142 |
| 5,822,416 | 10/1998 | Goodacre et al. ...................... | 379/142 |

Primary Examiner—Curtis A. Kuntz
Assistant Examiner—Duc Nguyen

[57] ABSTRACT

The present invention concerns a method and apparatus for displaying numbers of users involved in a connection on a display associated with a station. The network users have a specific device number, whereby each number may consist of a plurality of partial numbers. The number of the user involved in a connection will be compared to the specific device number and as a result, the shortest possible number will be displayed.

5 Claims, 4 Drawing Sheets

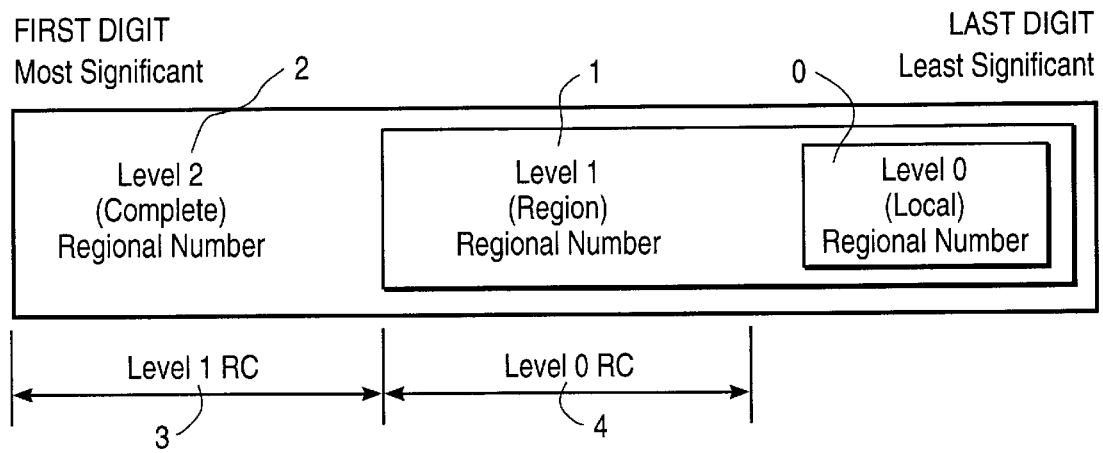
FIG_1
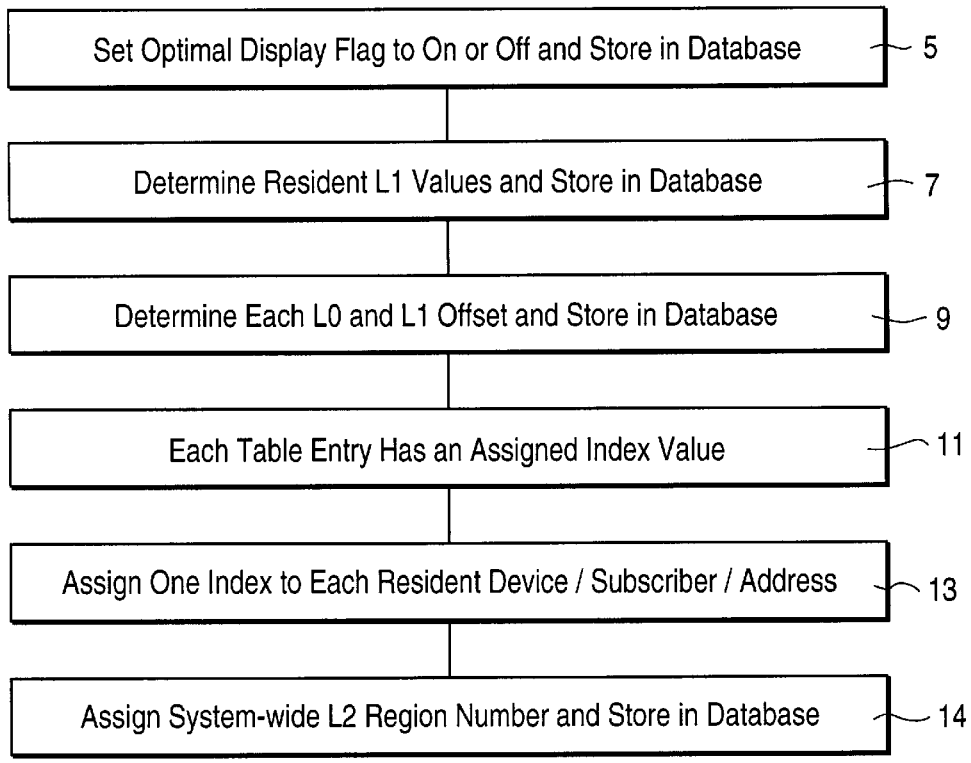
FIG_2

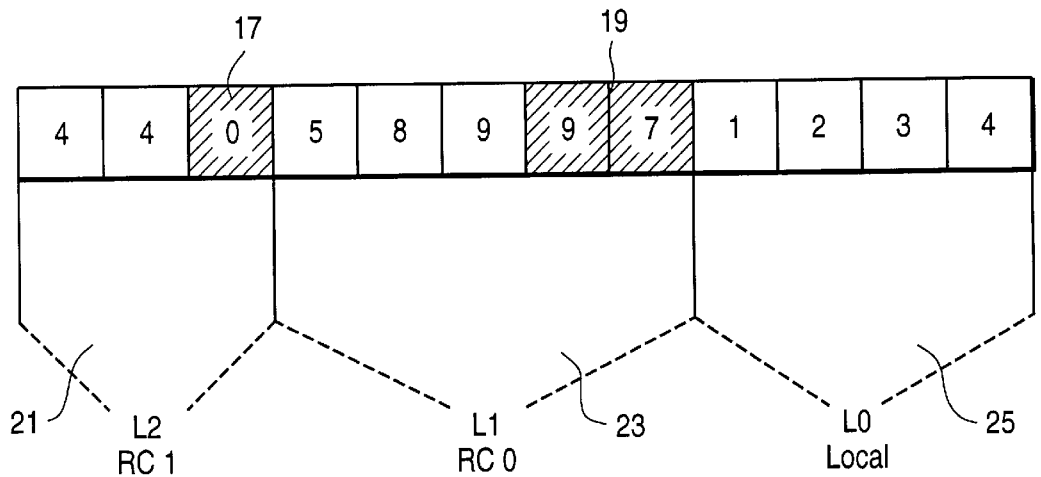
FIG_3
| Index | L1 Region Code | L1 Offset | L0 Offset | Population |
|---|---|---|---|---|
| 1 | 58997 | 1 | 2 | 345 |
| 2 | 954997 | 0 | 1 | 57 |
| 3 | 407487 | 0 | 0 | 469 |
| 4 | 333 | 0 | 1 | 23 |
| Etc. | | | | |
FIG_4

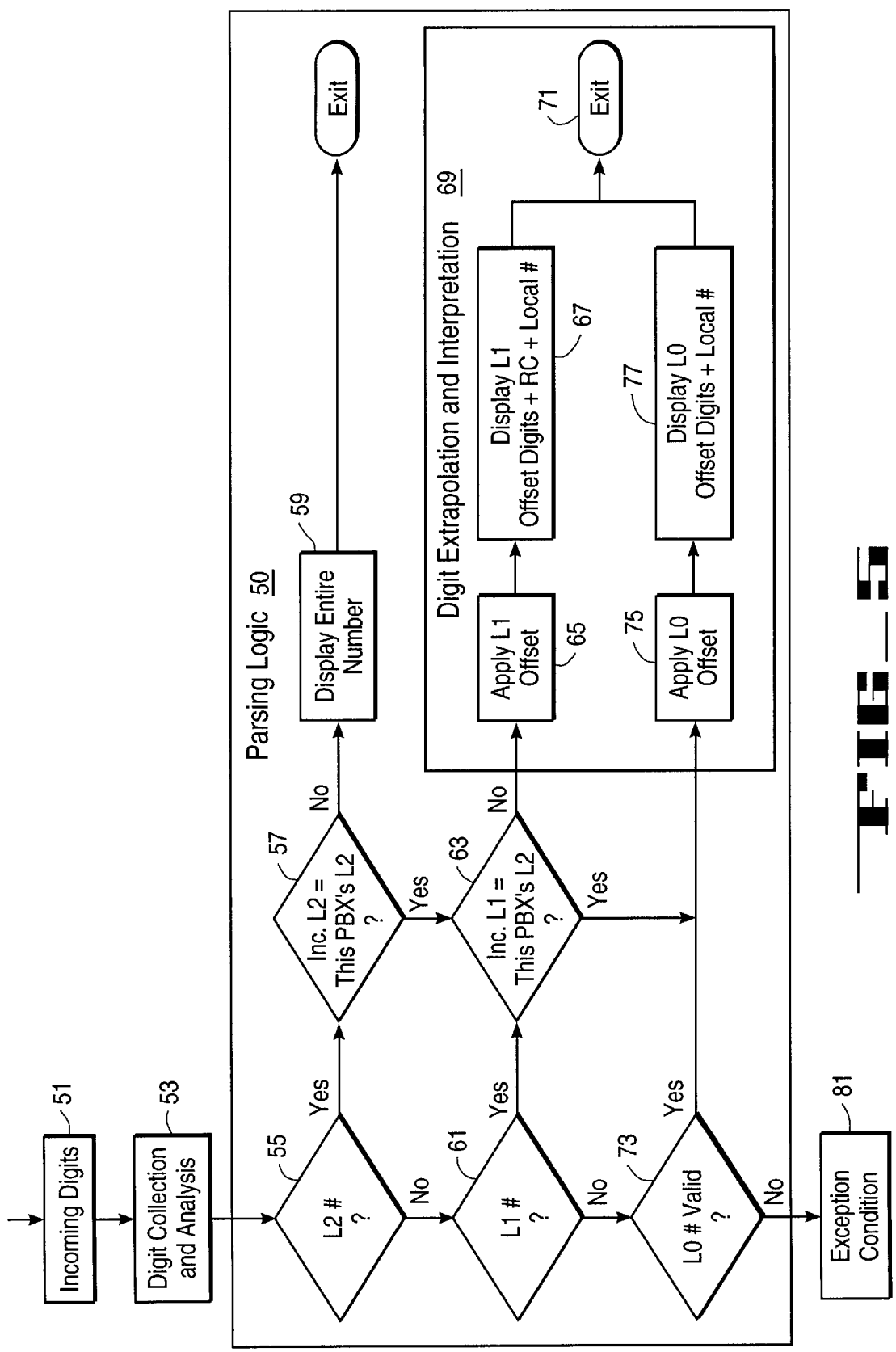
FIG._5

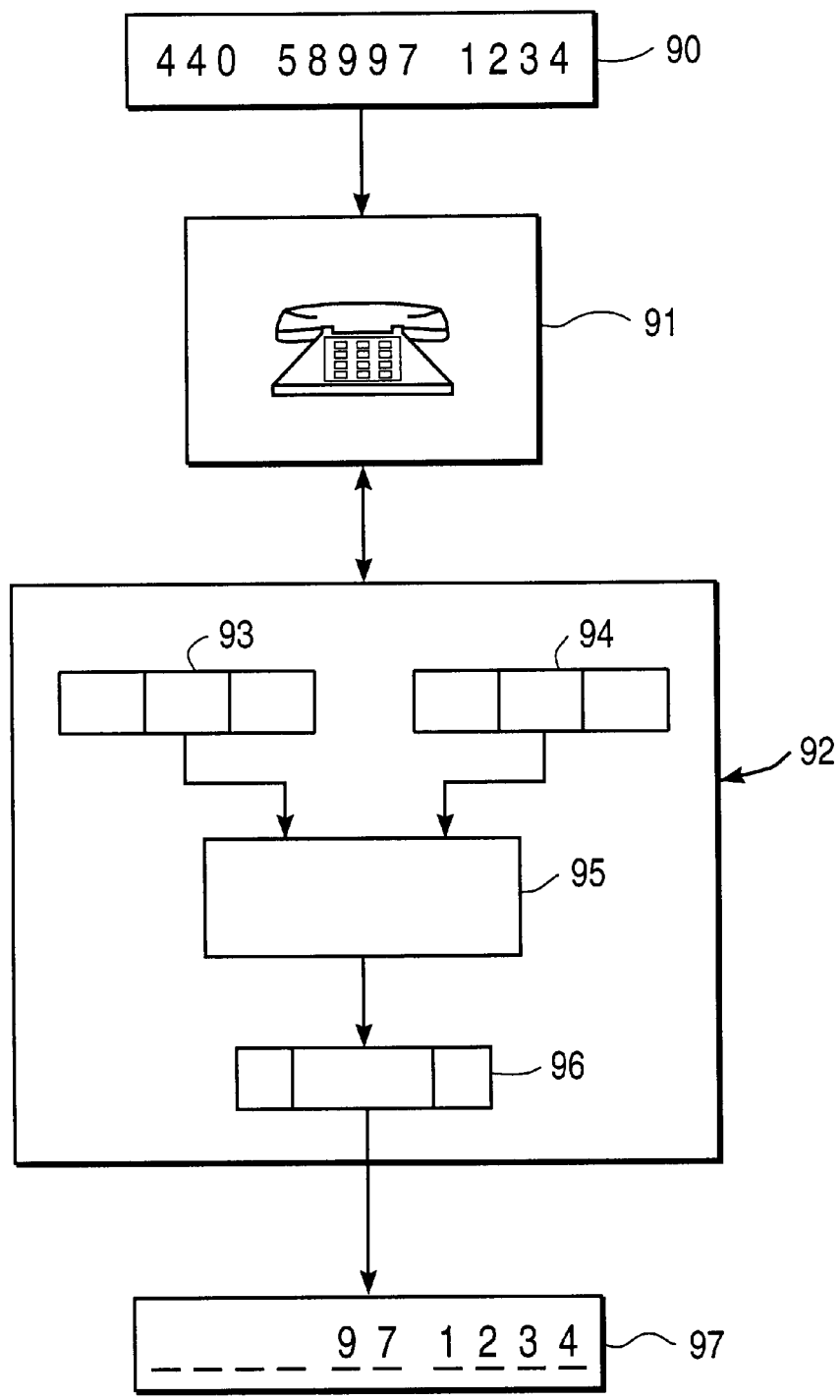
FIG_6

APPARATUS AND METHOD FOR DISPLAYING NUMBERS IN A COMMUNICATION NETWORK

BACKGROUND

The present invention concerns a method and an apparatus for displaying network numbers of users involved in a connection on a display associated with a device in a communication network.

Network numbers, e.g. telephone numbers, in the United States usually have a 3-level numbering plan structure with a first level, e.g. local number, a second level regional number, e.g. national number, and a third level complete number, e.g. international number. Some digital communication networks like an ISDN, and also some analog networks are capable of displaying the number of an incoming call on a device with a display.

The preferred embodiment of the present invention is described in terms of an apparatus and method for displaying network numbers in a private communication network, although the same concepts can be applied to other network addresses and applications. Numbering and sub-addressing in private ISDNs, for example, is well known and is standardized by ISO/IEC DIS 11571, ETS 300 189 and ECMA 155. The standards prescribe a hierarchically organized 3-level structure of Private Numbering Plans (PNP) and allow for both implicit and explicit numbering schemes.

Standards also dictate that, when two switches are in different regions for a given region level, the switch (also called a Private Telecommunication Network/Exchange (PTN/X) or private branch exchange (PBX)) sending a number must send a region number for that region level to the other switch, to avoid number ambiguity. Instead of sending just a lower region level number, the switch must convert the number into a region number of a higher level by adding the appropriate complete/regional number and changing the Type of Number (TON) accordingly. This means that switches ultimately must always send the highest level number to another switch since the call has the potential of leaving the region for any particular region level at any time during the life of the call, e.g. when the call is transferred to a different region level.

As a result, existing network systems that can display the number for an incoming call generally display the entire number. While the requirement of sending higher level region numbers is absolutely necessary, the user interface suffers with displays of very long numbers, resulting in truncation of feature messages like the user name display. Secondly, recognizing and remembering long numbers is more difficult than short numbers.

SUMMARY OF THE INVENTION

The present invention provides a method of digit interpretation and parsing by comparing numbers of users involved in a connection with the number of the station that is called. Thereby the system extracts the shortest possible unambiguous number and displays it on the respective display. The invention includes all types of numbers, e.g., alerting, connected, redirecting, calling, redirection. For example, an optional number display is applicable to a calling user who has been forwarded to another number. The comparison of the numbers can be achieved by comparing the numbers on a digit by digit basis, by comparing partial numbers beginning with the most significant part, or by comparing the complete numbers.

The system can further involve two functions. First, the system can provide a mechanism to parse a Network number, i.e. (Optional)region level 2 (L2), region level 1 (L1), and region level 0 (L0)) into a shortened form to be used for display within the context of the extension dialing area/domain of the call partners. This function is called "optimal number" in this disclosure. Optimal numbers are not used when the call partners belong to different regions.

Second, the system can use the same static data as function 1 and provide a means to overlay a local number (i.e. region L0 also called "local number") over the L1 number. The L1 number can also overlay a level 2 number, i.e. consisting of one ore more digits, of the level 1 regional number. Thus, this number is placed in front of the local number (for a Level 1 number), or part of the Level 1 number may overlap the Level 2 number resulting in a shorter number which can be dialed to reach a user. This function is called "overlap numbering" in this disclosure.

Optimal numbering and overlap numbering may co-exist or be employed separately within a network or parts of a network (i.e., different region levels). When optimal numbers and overlap numbers are both employed in a network or parts of a network, the optimal number length is comprised of the overlap number plus Ln, where "Ln" is either the Level 1 or Level 0 number.

BRIEF DESCRIPTION OF THE DRAWINGS

FIG. 1 is a respresentation of an exemplary 3-level PNP structure.

FIG. 2 lists steps for establishing the static data used in the invention.

FIG. 3 is an example of an overlapping number structure overlaying a 3-level PNP structure.

FIG. 4 is an indexed Static Data Table in accordance with the invention.

FIG. 5 is a flowchart of a method of the present invention, providing optimal number parsing and overlap numbering.

FIG. 6 is a functional block diagram of one embodiment of an apparatus of the present invention.

DESCRIPTION OF THE PREFERRED EMBODIMENT

With reference to FIG. 1, both ISO/IEC, ECMA, and ETSI support the structure of a PNP number with three levels of regions including components 0, 1, 2, each representing a different region level which has a respective regional number. A level n Regional Number is a sufficient number specification only within the level n region to which it applies. When that number is used outside that level n region, it shall be in the form of a Regional Number of level greater than n. In order to meet this requirement when calls are permitted between different regions of a given level, and not knowing when a call might be redirected outside one's own region, the highest region level number employed network-wide must always be sent to the network.

In FIG. 1 a complete number consists, for example, of three parts. The first one is component 0 which is a local number or a Level 0 Regional Number. The second one is component 4 which is called a Level 0 Region Code (i.e., RC 0) and the third one is component 3 is called a Level 1 Region Code (i.e, RC 1). A Level 1 Regional Number (component 1) combines a local number with RC0, while a Level 2 Regional Number (component 2) combines a Level 1 Regional Number with RC1. Component 0 will be referred to as a Level 0 number or a local number; component 1 will be reerred to as a Level 1 number; and component 2 will be referred to as a Level 2 number.

Level 1 numbers are an optional level when Level 0 numbers are unambiguous network-wide, and likewise, Level 2 numbers are optional levels when Level 1 numbers are unambiguous network-wide.

Referring to a specific embodiment of the present invention, FIG. 2 illustrates static data and processes that are preferably used to prepare for optimal numbering and overlap numbering. The method assembles static data associated with the invention. As an extension to prior art (i.e., standards), the invention provides an administrable flag (i.e., on/off) for parsing the structured number in order to determine and display an optimal number. The setting of the flag is illustrated as step 5 in FIG. 2. Optimal number usage and overlap numbers may be used together, not at all, or individually. Administration of overlap numbers is discussed in connection with FIG. 4. The display and dialing of overlap numbers compared to optimal numbers is discussed in connection with FIG. 5. Step 7 in FIG. 2 represents the administration of each RC 0 value (i.e., digit string) resident in this PBX. Each resident digit sequence for RC0 in this PBX is written into a database. In the preferred embodiment, the database takes the form of a Static Data table, as illustrated in FIG. 4. When overlap numbers are employed in this switch, step 9 is used to indicate the overlap offset into the higher level. Level 2 offset is not possible because Level 2 is the highest level. Step 11 declares that the static data is stored in an indexed table since the table may be accessed by an index value as well as by other means. In step 13, each local (resident) device/subscriber/network address must be assigned an index which points to the Level 0 Region Code (RC0) and the Level 1 Region Code (RC1) assigned to that user (when employed). The number of resident RCs is an implementation option. Step 14 represents the assignment of the Level 2 region number for this PBX. Although it is shown as a system-wide number, as an implementation option for more than one Level 2 number per switch, the Level 2 number could be added to the Static Data Table between FIG. 4 components 31 and 33 (no Level 2 offset needed). Spanning of RCs across switches forming a domain or subnetwork is an implementation option. The number length (fixed and/or variable) of each level is an implementation option. Static data is preferably administered at each switch in the network.

FIG. 3 is an example of a 3-level PNP number received at a terminating switch employing overlap numbers, where digits "440" are RC 1 (i.e., component 21), "58997" is the RC 0 (i.e., component 23), and "1234" is the local number (i.e., component 25). The concepts of the present invention apply regardless of the number of digits in any level of a numbering structure or the number of levels in the structure. The number of offset digits in a Level 1 or Level 0 can be no longer than the maximum length of the higher level.

As indicated above, overlap numbering is an implementation option. In the example of FIG. 3, the local number consists of four digits, providing 10,000 unique local numbers. If a network or subnetwork requires more than 10,000 unique addresses, an offset into RC0 may be defined. In this case, a user can dial the appropriate digits plus the appropriate local digits to reach another address within the network or subnetwork. The offset numbers increase the number of unique addresses within the network or subnetwork, without requiring that users dial the entire Level 1 number. In this event, the optimal number for a call within the network or subnetwork would consist of the offset digits plus the local digits, because these are the digits that must be dialed. Thus, when a first user receives a call from a second user within the network or subnetwork, an optimal number display would show the digits that must be dialed by the first user to reach the second user in a subsequent telephone call.

In the example of FIG. 3, the local number offset (component 19) into RC 0 is two digits and the RC 0 offset (component 17) into RC 1 is one digit. When optimal numbers are employed in this example, the Level 0 optimal number (when both users are in the same RC 0) would be "971234" and the Level 1 optimal number (when both users are in the same RC0 but not RC1) would be "058997" plus the local number "1234" resulting in a display digit string of "0589971234". Whereas with optimal number turned "off", the display digit string would be "440589971234". Insertion of dashes or spaces between numbers is an implementation option. When both overlap numbers and optimal numbers are employed, the optimal number always prefixes the offset digits onto the number (i.e., Level 0 or Level 1).

Still referring to FIG. 3, if optimal number is turned "on" (FIG. 2, component 5) but the Level 1 and Level 0 offset is zero (i.e., no overlapping numbers), the Level 0 optimal number (when both users are in the same RC 0) would be "1234" and the Level 1 optimal number (when both users are in the same RC 1 but not RC 0) would be "58997" plus the local number "1234" resulting in a display digit string of "1589971234".

Components 31, 33, 35, 39 and 41 of FIG. 4 comprise the Static Data Table built with the data shown in FIG. 2. Component 31 represents the index value of the table entry. Component 33 is the digit string value of the L1 region code resident in this switch. Component 35 is the Level 1 offset number of digits into the Level 2 number. Component 39 is the L0 offset number of of digits into the Level 1 number. In the preferred embodiment, the RC0 digit string value, component 33, in this table does not include the overlap digits into RC1. Component 41 is an accumulator for the number of users assigned to this index. It's usage is an implementation option. Referring back to the FIG. 3 example overlap number, the first table entry (i.e., referenced by index 1) in the FIG. 4 table reflects the correct administration for that number.

Referring now to FIG. 5, the incoming digits seen in component 51 represent a number (e.g., Called party Number, Connected Number) collected/received with digit collection/analysis component 53 at an originating or terminating PBX. Parsing Logic (i.e., component 50) and Digit Extrapolation and Interpretation (i.e., component 69) are utilized when a number is to be displayed. Parsing logic can handle numbers digit by digit or the complete number. For example, the parsing logic can extract the most significant partial number out of the number of the user involved in a connection. This partial number can be, for example, the Level 1 and Level 0 Region Codes and the Level 0 regional number. This partial number can have any size, for example in a special embodiment each partial number can represent a single digit beginning with the most significant digit as shown in FIG. 1.

Beginning with components 55, 61 and 73, the digits representing the regional number levels 2, 1, 0 are determined in the respective steps by interpreting the digits based on 1) recognition of the digit pattern on a digit-by digit comparison for an internal call (or unknown TON) or 2) by the ISDN Number IE TON encoding for a remote incoming number. The number (i.e., Level 2, Level 1, and L0) comparison is determined, in components 57, 63 and 73, to be resident/home or remote based on a comparison of the number digit string pattern (i.e., Level 2 or Level 1 or Level 0) respective to the 1) system administered Level 2 regional number (FIG. 2 step 14) and 2) Static Data Table components (FIG. 4 component 33). In component 73, it is assumed that the NO branch must lead to a malfunctioning number and therefore results in exception processing. Component 81 is an exception condition (e.g., out-of-service).

Still referring to FIG. 5, when a comparison of the number digits at the highest level (i.e., incoming Level 2=resident Level 2, step 14 of FIG. 2) depicted in component 57, does not match, then the entire number is displayed as is shown in component 59 and the procedure is exited. This means, for example, that the area codes of an incoming call and the PBX's own area code are different. Otherwise, when there is a match, component 63 is used to compare the Level 1 portion of the incoming number (Level 0 region Code) to the Level 1 portion of the PBX's own codes. When there is no match, the Level 1 and Level 0 numbers shall be displayed with any offset digits. The offset digits into Level 2 are obtained from the Static Data table by matching the incoming Level 1 portion to an entry in the Static Data table. Component 65 applies the Level 1 offset which results in component 67 displaying the Level 1 offset digits into Level 2 (i.e., FIG. 3, component 17) plus the Level 1 number (FIG. 3, component 23) plus the Level 0 number (FIG. 3, component 25). In this case the Level 0 offset in the Static Data Table is not used. When there is a match between the incoming Level 1 number and the Level 1 portion of the receiving stations address, then only the Level 0 number and any overlay digits are displayed. Component 75 applies the Level 0 offset to the Level 1 number and component 77 displays the Level 0 offset digits into Level 1 (i.e., FIG. 3, component 19) plus the Level 0 number (FIG. 3, component 25) and the procedure is exited. Components 75 and 77 also apply to component 73 when the Level 0 number is recognized in order to apply any overlap digits in the display.

FIG. 6 shows a schematic diagram of an embodiment of an apparatus example according to the present invention. Numeral 90 denotes the signal which contains the number of the incoming call that is sent to a device 91 equipped with a display. This device 91 is connected to a processing unit 92 which drives a display 97. The processing unit 92 and the display 97 can be either incorporated in an external device associated with the device 91 or incorporated integrally into the device 91, e.g., a PC or a workstation. The processing unit may comprise a microprocessor, however, if unit 92 and display 97 are incorporated into the device, a microprocessor controlling the device 91 can also be used. The microprocessor 92 according to FIG. 6 may comprise registers or memory locations 93, 94 and 96 which are linked together through an arithmetic logic unit 95. Registers 93 and 94 contain the number of the incoming call and the station number, respectively. The arithmetic unit 95 aso receives data from the Static Data Table illustrated in FIG. 4. According to the above mentioned process the arithmetic unit 95 compares and processes the optimal number dependent on the entries in the registers 93 and 94, respectively, and stores it in the register 96. The processing unit 92 then drives the display, such that the optimal number will be displayed on the display 97.

The embodiments described herein are merely illustrative of the principles of the present invention. Various modifications may be made thereto by persons ordinarily skilled in the art, without departing from the scope or spirit of the invention.

I claim:

1. A method for displaying a network number of an user involved in a connection on a display associated with a device having a specific network number, whereby each number may consist of a plurality of partial numbers, whereby the number of the user involved in a connection will be compared to the specific device number and as a result the shortest possible number will be displayed, including the steps:

a) extracting a most significant partial number out of the number of the user and out of the number of the specific device, b) comparing both most significant partial numbers, c) if there is a match then repeating steps a through c for the remaining partial number until no match occurs, d) evaluating whether there is an overlap offset in the last matching partial number, and if there is an overlap offset e) displaying the overlap offset followed by the remaining partial number with no match, and if not f) displaying the complete number or the remaining partial number.

2. A method as in claim 1 whereby the comparison is done by means of comparison table.

3. A method as in claim 1 whereby each partial number represents a single digit.

4. An apparatus for displaying a number of an user involved in a connection on a display associated to a device having a specific device number, whereby each number may consist of a plurality of partial numbers, whereby the apparatus comprises means to compare the number of the user involved in a connection with the specific device number whereby said means set up the shortest possible number of the incoming call upon this comparison and represent said shortest possible number on said displays, comprising:

means for extracting a most significant partial number out of the number of the user involved in a connection and out of the number of the device, comparing means for comparing both most significant partial numbers, whereby the comparing means generate a matching signal if a match occurs, means for repeating the extracting and comparing with the remaining partial number until no matching signal will be generated, means for displaying the complete number or the remaining partial number, evaluating means for evaluating whether there is an overlap offset in the last matching partial number, which add the offset number as a preceding part to the remaining partial number.

5. An apparatus as in claim 4 comprising:

evaluating means for evaluating whether there is an overlap offset in the last matching partial number which add the offset number as a preceding part to the remaining partial number.

* * * * *